(No Model.)

G. WESTINGHOUSE, Jr.
STOP VALVE BOX FOR PIPE LINES.

No. 319,765. Patented June 9, 1885.

WITNESSES:
JSnowden Bell
R. H. Whittlesey

INVENTOR.
George Westinghouse, Jr.
BY George H. Christy
ATTORNEY.

United States Patent Office.

GEORGE WESTINGHOUSE, JR., OF PITTSBURG, PENNSYLVANIA.

STOP-VALVE BOX FOR PIPE-LINES.

SPECIFICATION forming part of Letters Patent No. 319,765, dated June 9, 1885.

Application filed March 19, 1885. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered certain new and useful Improvements in Gate or Stop-Valve Boxes for Pipe-Lines, of which improvements the following is a specification.

Figure 1:
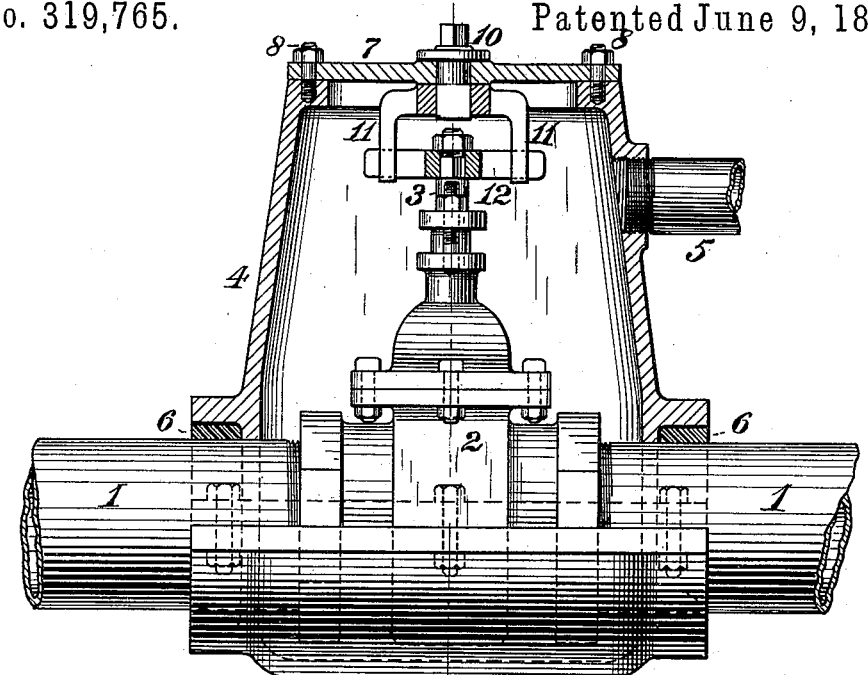
Figure 2:
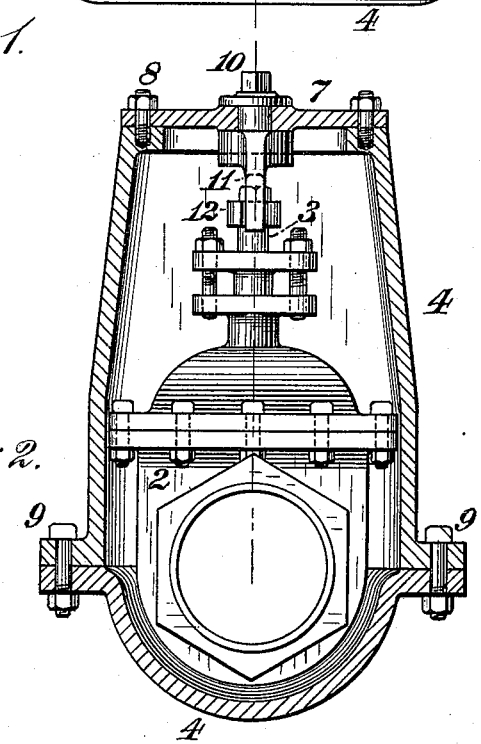

In the accompanying drawings, which make part of this specification, Figure 1 is a side view in elevation of a portion of a pipe-line and a gate-valve, with the valve-box partly in elevation and partly in longitudinal central section, and Fig. 2 an end view of the valve, with the valve-box in transverse section.

The object of my invention is to obviate liability to accident from leakage of gas at the joints of gates or stop-valves in pipe-lines, as well as to admit of the convenient operation of the valve and ready access thereto whenever desired.

To these ends my invention, generally stated, consists in the combination, with a pipe-line and a gate or stop-valve therein, of a gas-tight box or casing inclosing said valve and provided with a tight removable cover; also, in the combination, with a pipe-line and a gate or stop-valve therein, of a gas-tight box or casing inclosing the valve, and a device for actuating the valve-stem from the exterior of the casing; also, in the combination, with a pipe-line and a gate or stop-valve therein, of a gas-tight box or casing inclosing said valve, and a vent-pipe leading from said casing to a suitable point of discharge. The improvements claimed are hereinafter more fully set forth.

In the practice of my invention I inclose the chest or body 2 of a gate or stop-valve, which may be located in any desired position in the length of a pipe-line, 1, within a gas-tight box or casing, 4, which completely incloses said valve-chest 2 and the portion of the valve-stem 3 which projects therefrom and fits at its ends closely around the pipe-line 1, tight joints being made at its junction therewith by packing 6, of any suitable material, fitting closely around the pipe in recesses or sockets in the box 4. An opening of sufficient size to afford access to the valve for purposes of examination, renewal, or repair is formed in the top of the box 4, said opening being closed by a tight removable door, 7, which is secured in position by bolts 8, or by a clamp or clamps of any suitable construction.

To facilitate the location of the box or casing 4 in desired position and its removal therefrom when necessary it is preferably made in sections, as shown, which are fitted accurately one to the other, either with or without the interposition of packing, and connected by bolts 9, passing through proper lugs or flanges on the casing-sections.

A vent-pipe, 5, connected to the casing and leading therefrom to any point above the surface of the ground at which the escape of gas may be permitted without danger or inconvenience, serves to carry off any leakage that may occur at the joints of the valve-chest and the ends of the pipe-sections connected thereto. The joints of the casing-sections, as well as those between the casing and pipe-line, must be made as accurately as possible, in order that the casing shall be, as nearly as is practicable, perfectly gas-tight.

The box or casing 4 is further provided with a device whereby the valve-stem 3 may be actuated from the exterior of the casing, such device consisting, in this instance, of a stem, 10, which passes through the door 7 with sufficient freedom to admit of its easy rotation, and is accurately fitted to the opening in the door through which it passes, so as to prevent leakage of gas thereat. The stem 10 may be extended to any desired height above the box 4, and is squared on its upper end to receive a wrench or hand-wheel by which it may be rotated, such rotation being communicated to the valve-stem 3 by arms 11 secured to the operating-stem on the inner side of the door 7, and bearing against or fitting in slots in arms 12, secured to the upper end of the valve-stem 3.

If desired, the mechanism above described may be dispensed with and the valve-stem 3 extended outwardly through the door, but greater freedom of action will be attained by the employment of a separate operating-stem and a proper device for transmitting the movement thereof to the valve-stem, as above specified.

I am aware that the use of loose boxes or cases for inclosing hydrants and keeping the same clear of the surrounding earth is not new, and casings of such character I therefore disclaim, my invention being limited to a substantially gas-tight case when combined with a gate or stop-valve and a pipe-line in the manner and for the purposes described.

I claim herein as my invention—

1. The combination, with a pipe-line and a gate or stop-valve governing communication through said line, of a gas-tight box or casing inclosing said valve and fitting closely around the line at its ends, and a tight removable cover closing an opening in said casing, substantially as set forth.

2. The combination, with a pipe-line and a gate or stop-valve governing communication through said line, of a gas-tight box or casing inclosing said valve and formed of two separate abutting sections fitting at their ends closely around the pipe-line, substantially as set forth.

3. The combination, with a pipe-line and a gate or stop-valve governing communication through said line, of a gas-tight box or casing inclosing said valve and fitting closely around the line at its ends, and an actuating-stem passing through the casing and coupled to the valve-stem so as to admit movement to be imparted thereto from the exterior of the casing, substantially as set forth.

4. The combination, with a pipe-line and a gate or stop-valve governing communication through said line, of a gas-tight box or casing inclosing said valve and fitting closely around the line at its ends, and a vent-pipe leading from said casing to a suitable point of discharge, substantially as set forth.

In testimony whereof I have hereunto set my hand.

GEO. WESTINGHOUSE, JR.

Witnesses:
J. SNOWDEN BELL,
R. H. WHITTLESEY.